United States Patent Office 3,384,646
Patented May 21, 1968

3,384,646
16-HYDROXY-17-OXY-16-OXYMETHYL-
ANDROST-4-EN-3-ONES
Ivar Laos, Skokie, Ill., assignor to G. D. Searle & Co.,
Chicago, Ill., a corporation of Delaware
No Drawing. Filed June 18, 1965, Ser. No. 465,170
5 Claims. (Cl. 260—397.4)

ABSTRACT OF THE DISCLOSURE

Preparation of the captioned compounds—for example, 16α,17β-dihydroxy-16β-hydroxymethylandrost - 4 - en - 3-one—and their valuable pharmacological properties—specifically, androgenic activity—are disclosed.

This invention relates to 16-hydroxy-17-oxy-16-oxymethylandrost-4-en-3-ones and processes for the manufacture thereof. More particularly, this invention provides new, useful, and unobvious chemical compounds of the formula

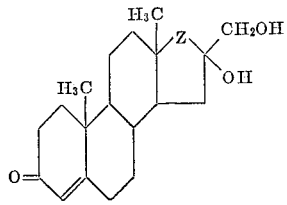

wherein Z represents a carbonyl, β-hydroxymethylene, or β-hydroxy-α-methylmethylene radical, and congeners of the enformulated compounds derived by esterification of one or more of the hydroxyls therein. Preferred esters are those wherein each esterifying moiety is the residue of benzoic or a lower alkanoic acid, i.e., a radical of the formula

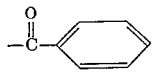

or

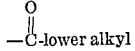

The 16-oxymethyl group is ordinarily but not necessarily unexceptionably disposed in the β configuration. (Configuration at carbon atom 16 in the product of Example 6 hereinafter has not been assigned.)

The compounds to which this invention relates are useful by reason of their valuable pharmacological properties. Thus, for example, the subject compounds are androgenic agents.

Preparation of 16α,17β-dihydroxy-16β-hydroxymethylandrost-4-en-3-one proceeds by reducing 3β-acetoxy-16-methyleneandrost-5-en-17-one (J. Amer. Chem. Soc., 70, 3872 (1948)) to the corresponding 17β-ol with sodium borohydride, esterifying the 17-hydroxyl with benzoyl chloride in pyridine, saponifying the 3-acetoxyl with methanolic potassium hydroxide, oxidizing the resultant 3-ol to a 3-one with cyclohexanone and aluminum isopropoxide in toluene, converting the resultant 17β-benzoyloxy-16-methyleneandrost - 4 - en - 3 - one to 17β-benzoyloxy-16α-hydroxy - 16β - hydroxymethylandrost-4-en-3-one with osmium tetraoxide, and saponifying the latter ester—as before—with methanolic potassium hydroxide. Both 16α-hydroxy-16β-hydroxymethylandrost-4-ene-3,17-dione and 16,17β-dihydroxy-16-hydroxymethyl-17α-methylandrost-4-en-3-one are prepared directly from the prior art 16-methylene compounds (J. Amer. Chem. Soc., 77, 5676 (1955) and Ber., 94, 2897 (1961), respectively) via osmium tetraoxide. The congeneric esters eventuate from the parent alcohols by heating with an appropriate acid anhydride or chloride and pyridine.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

Example 1

A. 3β-acetoxy-16-methyleneandrost-5-en-17β-ol.—To a solution of 342 parts of 3β-acetoxy-16-methyleneandrost-5-en-17-one in 12,000 parts of methanol under nitrogen is added 40 parts of sodium borohydride. The resultant mixture is stirred at room temperature for 30 minutes, whereupon excess sodium borohydride is decomposed by addition of 60 parts of acetic acid. Most of the methanol is removed by vacuum distillation and the residue poured into ice-water. The white solid which precipitates is filtered off, washed with water, dried in air, and recrystallized from a mixture of acetone and hexane to give 3β-acetoxy-16-methyleneandrost-5-en-17β-ol melting at approximately 139–140°.

B. 3β-acetoxy17β - benzoyloxy-16-methyleneandrost-5-en.—A mixture of 90 parts of 3β-acetoxy-16-methyleneandrost-5-en-17β-ol, 128 parts of benzoyl chloride, and 900 parts of pyridine is heated at 90–95° for 1½ hours, whereupon the mixture is cooled and diluted with 60 parts of water. The resultant mixture is heated at 90–95° for ½ hour, then chilled and poured into ice-water. The yellowish solid thrown down is filtered off, washed with water, and dried in air. The product thus isolated is 3β-acetoxy-17β-benzoyloxy-16-methyleneandrost-5-en melting at 159–161°.

C. 17β - benzoyloxy - 16 - methyleneandrost-5-en-3β-ol.—To a solution of 1402 parts of 3β-acetoxy-17β-benzoyloxy-16-methyleneandrost-5-en in 31,200 parts of dioxane and 200 parts of water in a nitrogen atmosphere is added, with vigorous agitation, a solution of 198 parts of potassium hydroxide in 13,200 parts of methanol. The resultant mixture is stirred for 10 minutes, whereupon an additional 198 parts of potassium hydroxide dissolved in 13,200 parts of methanol is introduced and stirring then resumed for a further 50 minutes. A solution of 198 parts of acetic acid in 1200 parts of water is thereupon introduced, after which most of the methanol is removed by vacuum distillation. The residual slurry is diluted with ice-water, and the solid which precipitates is filtered off and recrystallized from acetone to give 17β-benzoyloxy-16-methyleneandrost-5-en-3β-ol melting at 200–205°.

D. 17β-benzoyloxy-16-methyleneandrost-4-en-3-one.—To a solution of 311 parts of 17β-benzoyloxy-16-methyleneandrost-5-en-3β-ol in 3000 parts of cyclohexanone and 10,800 parts of anhydrous toluene at the boiling point under reflux is added, during approximately 6 minutes, a mixture of 312 parts of aluminum isopropoxide and 4050 parts of anhydrous toluene. Heating at the boiling point under reflux is continued for 40 minutes, whereupon a solution of 5400 parts of Rochelle salt in 9000 parts of water is introduced and the resultant mixture steam distilled. The solid precipitate thrown down in the distilland is filtered off and recrystallized from ether to give 17β-benzoyloxy-16-methyleneandrost-4-en - 3 - one melting at 174–176°.

E. 17β-benzoyloxy-16α-hydroxy - 16β - hydroxymethylandrost-4-en-3-one.—To a solution of 156 parts of 17β-benzoyloxy-16-methyleneandrost-4-en-3-one in 1500 parts of pyridine at room temperature is added 100 parts of osmium tetraoxide. The resultant mixture is stirred in a sealed vessel for 4 hours, whereupon a solution of 180 parts of sodium bisulfite in 3000 parts of water and 2000 parts of pyridine is introduced and stirring thereupon resumed for 20 minutes. The mixture thus obtained is extracted with cholorform. The chloroform extract is washed with water and freed of solvent by vacuum distillation. The residue is taken up in ethyl acetate; and the ethyl acetate solution is successively washed with 2% hydrochloric acid, aqueous 5% sodium bicarbonate, and water, whereupon it is dried over sodium sulfate and stripped of solvent by vacuum distillation. The residue, recrystallized from ethyl acetate, affords 17β-benzoyloxy-16α-hydroxy-16β-hydroxymethylandrost-4-en-3-one melting at 248.5–252°. The product has the formula

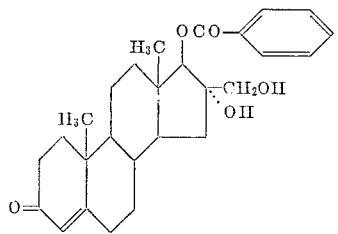

Example 2

16α,17β-dihydroxy-16β-hydroxymethylandrost-4-en-3-one.—To a solution of 570 parts of potassium hydroxide in 900 parts of water and 6480 parts of methanol is added 182 parts of 17β-benzoyloxy-16α-hydroxy-16β-hydroxymethylandrost-4-en-3-one. The resultant mixture is heated at the boiling point under reflux in a nitrogen atmosphere for 22 hours, whereupon excess potassium hydroxide is neutralized with acetic acid and most of the methanol thereupon removed by vacuum distillation. The residual slurry is diluted with water and the crystalline solid thrown down filtered off, washed with water, and dried in air. The product thus isolated is 16α,17β-dihydroxy-16β-hydroxymethylandrost-4-en-3-one melting at 229–232° and having the formula

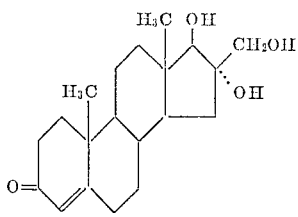

Example 3

17β-acetoxy-16β-acetoxymethyl-16α-hydroxyandrost-4-en-3-one.—To a solution of 4 parts of 16α,17β-dihydroxy-16β-hydroxymethylandrost-4-en-3-one in 40 parts of pyridine is added 30 parts of acetic anhydride. The resultant mixture is heated at 90–95° for 2½ hours, then chilled and poured into water. The mixture thus obtained is extracted with ether. The ether extract is successively washed with water, 2% hydrochloric acid, water, aqueous 5% sodium bicarbonate, and water, then freed of solvent by distillation. The residue is chromatographed on silica gel, using benzene and ethyl acetate as developing solvents. From an eluate comprising 30% ethyl acetate in benzene, on evaporation of solvent and recrystallization of the residue from ethyl acetate, is obtained 17β-acetoxy-16β-acetoxymethyl-16α-hydroxyandrost-4-en-3-one, the formula of which is

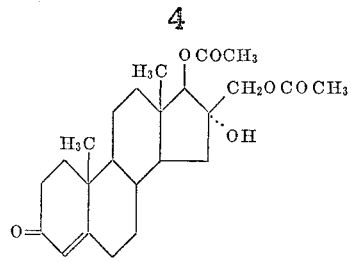

Example 4

16β-acetoxymethyl-17β-benzoyloxy-16α-hydroxy-androst-4-en-3-one.—Substitution of 4 parts of 17β-benzoyloxy-16α-hydroxy-16β-hydroxymethylandrost-4-en-3-one for the 16α,17β-dihydroxy-16β-hydroxymethylandrost-4-en-3-one called for in Example 3 affords, by the procedure there detailed, 16β-acetoxymethyl-17β-benzoyloxy-16α-hydroxy-androst-4-en-3-one, having the formula

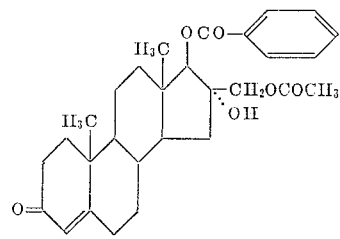

Example 5

16α-hydroxy-16β-hydroxymethylandrost-4-ene-3,17-dione.—To a solution of 142 parts of 16-methyleneandrost-4-ene-3,17-dione in 1800 parts of pyridine at room temperature is added 123 parts of osmium tetraoxide. The resultant mixture is stirred in a closed vessel for 4 hours, whereupon a solution of 209 parts of sodium bisulfite in 3500 parts of water and 2300 parts of pyridine is introduced, and stirring thereupon resumed for 20 minutes. The mixture thus obtained is extracted with chloroform. The chloroform extract is washed with water and freed of solvent by vacuum distillation. The residue is taken up in ethyl acetate; and the ethyl acetate solution is successively washed with 2% hydrochloric acid, water, aqueous 5% sodium bicarbonate, and water, then dried over anhydrous sodium sulfate and stripped of solvent by vacuum distillation. The residue, recrystallized from acetone, affords 16α-hydroxy-16β-hydroxymethylandrost-4-ene-3,17-dione melting at 204–206°. The product has the formula

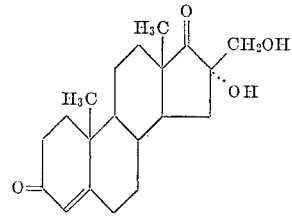

Example 6

16,17β-dihydroxy-16-hydroxymethyl-17α-methylandrost-4-en-3-one.—To a solution of 183 parts of 17β-hydroxy-17α-methyl-16-methyleneandrost-4-en-3-one in 2300 parts of pyridine at room temperature is added 151 parts of osmium tetraoxide. The resultant mixture is stirred in a sealed vessel for 4 hours, whereupon a solution of 257 parts of sodium bisulfite in 4300 parts of water and 2800 parts of pyridine is introduced, and stirring thereupon resumed for 20 minutes. The mixture thus obtained is extracted with chloroform. The chloroform extract is washed with water and stripped of solvent by vacuum distillation. The residue is taken up in ethyl acetate; and the ethyl acetate solution is successively washed with 2% hydrochloric acid, water, aqueous 5% sodium bicarbonate, and water, then dried over anhydrous sodium sulfate and stripped of solvent by vacuum distillation. The residue was chromatographed on neutral alumina, using methanol and ethyl acetate as developing solvents. From an eluate comprising 10% methanol in ethyl acetate, on evaporation of solvent and recrystallization of the residue from a mixture of ethyl acetate and hexane, 16,17β-dihydroxy-16-hydroxymethyl - 17α - methylandrost-4-en-3-one melting at 207–209° is obtained. The product has the formula

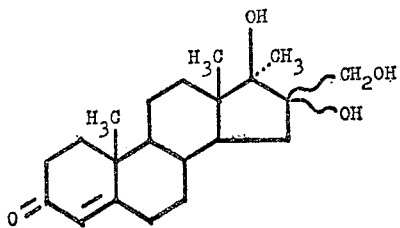

What is claimed is:
1. A compound selected from the group consisting of compounds of the formula

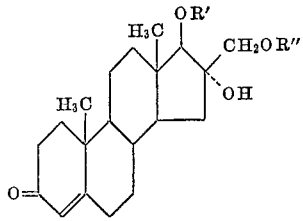

and

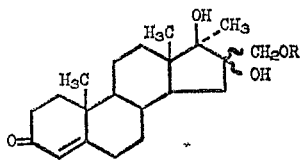

wherein R' is selected from the group consisting of hydrogen and radicals of the formula

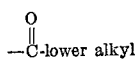

and

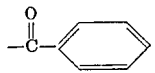

R" is hydrogen when R' is hydrogen and otherwise is selected from the group consisting of radicals of the formulas

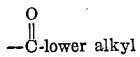

and

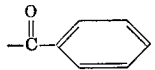

and R is selected from the group consisting of hydrogen and radicals of the formulas

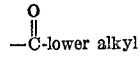

and

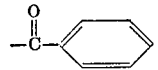

2. 17β-benzoyloxy-16α-hydroxy - 16β - hydroxymethylandrost-4-en-3-one.
3. 16α,17β-dihydroxy - 16β - hydroxymethylandrost-4-en-one.
4. 17β-acetoxy-16β-acetoxymethyl - 16α - hydroxyandrost-4-en-3-one.
5. 16,17β-dihydroxy-16-hydroxymethyl - 17α - methylandrost-4-en-3-one.

References Cited
UNITED STATES PATENTS
3,271,391   9/1966   Bertin et al. _____ 260—239.55

LEWIS GOTTS, *Primary Examiner.*
E. G. LOVE, *Assistant Examiner.*

UNITED STATES PATENT OFFICE
CERTIFICATE OF CORRECTION

Patent No. 3,384,646

May 21, 1968

Ivar Laos

It is certified that error appears in the above identified patent and that said Letters Patent are hereby corrected as shown below:

Column 6, line 31, "en-one" should read -- en-3-one --.

Signed and sealed this 20th day of January 1970.

(SEAL)
Attest:

Edward M. Fletcher, Jr.
Attesting Officer

WILLIAM E. SCHUYLER, JR.
Commissioner of Patents